(12) United States Patent
Strandborg et al.

(10) Patent No.: US 12,094,143 B2
(45) Date of Patent: Sep. 17, 2024

(54) IMAGE-BASED ENVIRONMENT RECONSTRUCTION

(71) Applicant: Varjo Technologies Oy, Helsinki (FI)

(72) Inventors: Mikko Strandborg, Hangonkylä (FI); Petteri Timonen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 388 days.

(21) Appl. No.: 17/547,769

(22) Filed: Dec. 10, 2021

(65) Prior Publication Data

US 2023/0186500 A1   Jun. 15, 2023

(51) Int. Cl.
  *G06T 7/557*  (2017.01)
  *G06T 7/73*   (2017.01)
  *G06T 19/00*  (2011.01)

(52) U.S. Cl.
  CPC .............. *G06T 7/557* (2017.01); *G06T 7/74* (2017.01); *G06T 19/006* (2013.01); *G06T 2207/10028* (2013.01)

(58) Field of Classification Search
  CPC ......... G06T 7/557; G06T 7/74; G06T 19/006; G06T 2207/10028; G06T 15/205; G06T 17/005
  See application file for complete search history.

(56) References Cited

U.S. PATENT DOCUMENTS

2018/0357819 A1* 12/2018 Oprea ............... G06T 19/00
2020/0364893 A1* 11/2020 Shtok ............... G06T 7/60

* cited by examiner

*Primary Examiner* — Jianxun Yang
(74) *Attorney, Agent, or Firm* — Ziegler IP Law Group LLC.

(57) ABSTRACT

A computer-implemented method including: capturing visible-light images via visible-light camera(s) from view points in real-world environment, wherein 3D positions of view points are represented in coordinate system; dividing 3D space of real-world environment into 3D grid of convex-polyhedral regions; creating 3D data structure including nodes representing convex-polyhedral regions of 3D space; determining 3D positions of pixels of visible-light images based on 3D positions of view points; dividing each visible-light image into portions, wherein 3D positions of pixels of given portion of said visible-light image fall inside corresponding convex-polyhedral region; and storing, in each node, portions of visible-light images whose pixels' 3D positions fall inside corresponding convex-polyhedral region, wherein each portion of visible-light image is stored in corresponding node.

23 Claims, 2 Drawing Sheets

IMAGE-BASED ENVIRONMENT RECONSTRUCTION

TECHNICAL FIELD

The present disclosure relates to computer-implemented methods for image-based environment reconstruction. The present disclosure also relates to systems for image-based environment reconstruction. The present disclosure also relates to computer program products for image-based environment reconstruction.

BACKGROUND

With advancements in evolving technologies such as immersive extended-reality (XR) technologies, demand for high-quality image generation has been increasing. It is often required by such technologies that the image generation be performed in real time. Some image generation techniques typically rely on image reconstruction using data structures such as three-dimensional (3D) point clouds, voxel representations (for example, using truncated signed distance fields), 3D meshing, and the like. In such techniques, visual content of real-world environments is modelled into the data structures, and these data structures are employed as input for generating images to be displayed at display devices.

However, existing techniques and existing hardware for generation and utilization of these data structures suffer from several limitations. Firstly, the data structures such as the 3D point clouds and the voxel representations lack a required resolution which is necessary for high fidelity image resynthesis. These data structures have limited capability in terms of representing visual details of the real-world environments. In particular, these data structures only include generic (i.e., coarse) visual details of the real-world environments, and not fine details such as text, patterns, textures, and the like. As a result, images generated using such data structures have poor quality. Secondly, the data structures such as the 3D meshing are only suitable for static environments and are not able to capture high detail geometry. Such data structures are mostly suitable only for applications where coarse representation is desired (for example, such as collision detection and virtual object placement). With respect to the above-mentioned limitations of the data structures, when it is required to perform the image reconstruction in real-time, the existing techniques cannot be scaled up to a high enough quality on the existing hardware. This adversely impacts viewing experiences provided by the evolving technologies which utilize the images generated by such data structures. Thirdly, the existing techniques fail to correctly capture and reproduce eye-dependent lighting such as specular highlights or reflections in the real-world environments, and to properly reconstruct thin objects present in the real-world environments.

Therefore, in light of the foregoing discussion, there exists a need to overcome the aforementioned drawbacks associated with existing techniques and hardware for generation and utilization of data structures for generating images.

SUMMARY

The present disclosure seeks to provide a computer-implemented method for image-based environment reconstruction. The present disclosure also seeks to provide a system for image-based environment reconstruction. The present disclosure also seeks to provide a computer program product for image-based environment reconstruction. An aim of the present disclosure is to provide a solution that overcomes at least partially the problems encountered in prior art.

In a first aspect, an embodiment of the present disclosure provides a computer-implemented method comprising:
   capturing visible-light images of a given real-world environment via at least one visible-light camera from a plurality of view points in the given real-world environment, wherein 3D positions of the plurality of view points are represented in a given coordinate system;
   dividing a 3D space occupied by the given real-world environment into a 3D grid of convex-polyhedral regions, wherein the 3D grid is represented in the given coordinate system;
   creating a 3D data structure comprising a plurality of nodes, each node representing a corresponding convex-polyhedral region of the 3D space occupied by the given real-world environment;
   determining 3D positions of pixels of the visible-light images in the given coordinate system, based on the 3D positions of corresponding view points from which the visible-light images are captured;
   dividing each visible-light image into a plurality of portions, wherein 3D positions of pixels of a given portion of said visible-light image fall inside a corresponding convex-polyhedral region of the 3D space; and
   storing, in each node of the 3D data structure, corresponding portions of the visible-light images whose pixels' 3D positions fall inside a corresponding convex-polyhedral region of the 3D space.

In a second aspect, an embodiment of the present disclosure provides a system comprising:
   at least one visible-light camera; and
   at least one server configured to:
      receive visible-light images of a given real-world environment captured by the at least one visible-light camera from a plurality of view points in the given real-world environment, wherein 3D positions of the plurality of view points are represented in a given coordinate system;
      divide a 3D space occupied by the given real-world environment into a 3D grid of convex-polyhedral regions, wherein the 3D grid is represented in the given coordinate system;
      create a 3D data structure comprising a plurality of nodes, each node representing a corresponding convex-polyhedral region of the 3D space occupied by the given real-world environment;
      determine 3D positions of pixels of the visible-light images in the given coordinate system, based on the 3D positions of corresponding view points from which the visible-light images are captured;
      divide each visible-light image into a plurality of portions, wherein 3D positions of pixels of a given portion of said visible-light image fall inside a corresponding convex-polyhedral region of the 3D space; and
      store, in each node of the 3D data structure, corresponding portions of the visible-light images whose pixels' 3D positions fall inside a corresponding convex-polyhedral region of the 3D space.

In a third aspect, an embodiment of the present disclosure provides a computer program product comprising a non-transitory machine-readable data storage medium having stored thereon program instructions that, when executed by a processor, cause the processor to:
  receive visible-light images of a given real-world environment captured by at least one visible-light camera from a plurality of view points in the given real-world environment, wherein 3D positions of the plurality of view points are represented in a given coordinate system;
  divide a 3D space occupied by the given real-world environment into a 3D grid of convex-polyhedral regions, wherein the 3D grid is represented in the given coordinate system;
  create a 3D data structure comprising a plurality of nodes, each node representing a corresponding convex-polyhedral region of the 3D space occupied by the given real-world environment;
  determine 3D positions of pixels of the visible-light images in the given coordinate system, based on the 3D positions of corresponding view points from which the visible-light images are captured;
  divide each visible-light image into a plurality of portions, wherein 3D positions of pixels of a given portion of said visible-light image fall inside a corresponding convex-polyhedral region of the 3D space; and
  store, in each node of the 3D data structure, corresponding portions of the visible-light images whose pixels' 3D positions fall inside a corresponding convex-polyhedral region of the 3D space.

Embodiments of the present disclosure substantially eliminate or at least partially address the aforementioned problems in the prior art, and enable creation of a 3D data structure which can be efficiently utilized to reconstruct accurate high-resolution images of real-world environments.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
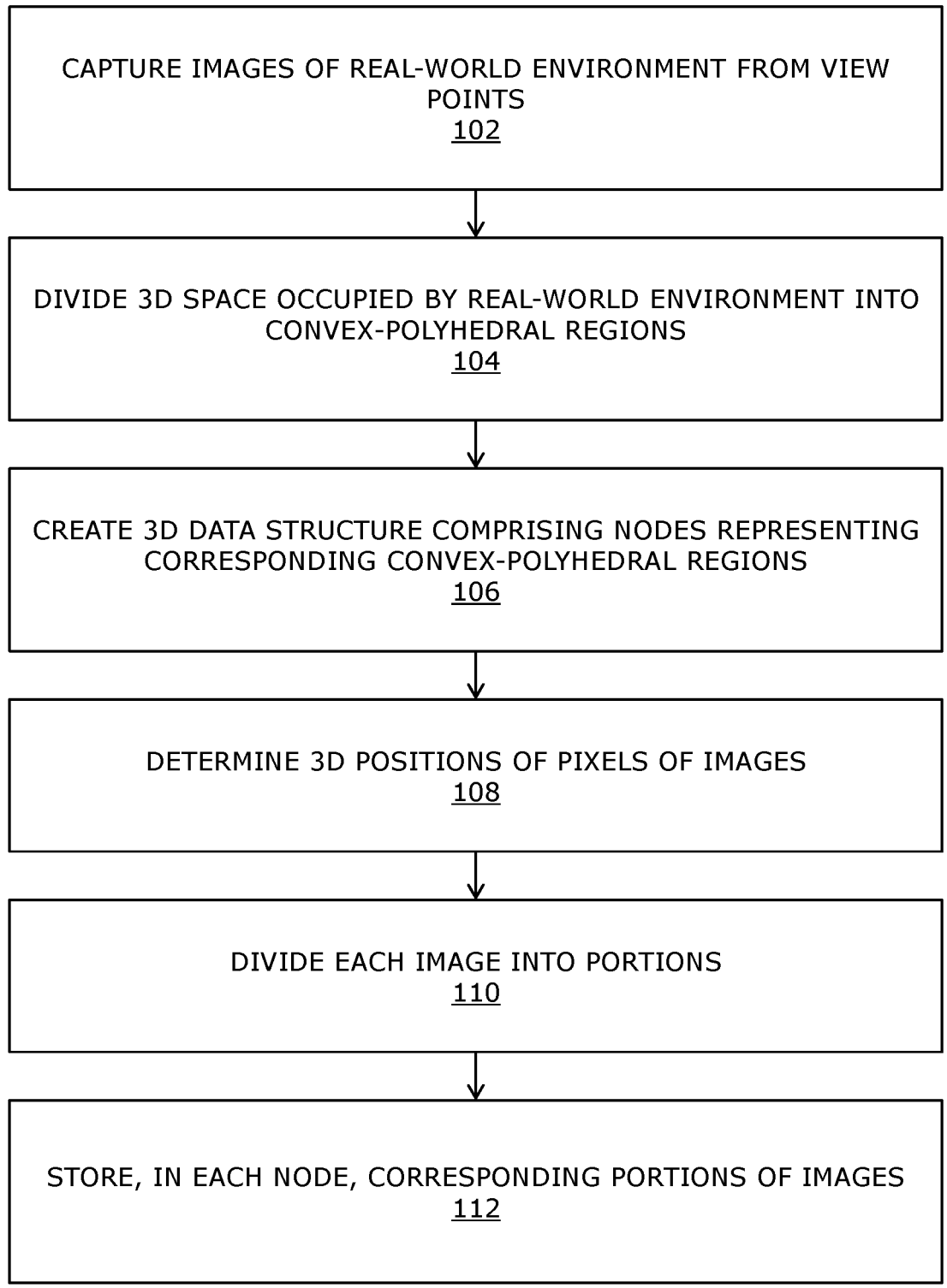
FIG. 1 illustrates steps of a computer-implemented method, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a computer-implemented method comprising:
  capturing visible-light images of a given real-world environment via at least one visible-light camera from a plurality of view points in the given real-world environment, wherein 3D positions of the plurality of view points are represented in a given coordinate system;
  dividing a 3D space occupied by the given real-world environment into a 3D grid of convex-polyhedral regions, wherein the 3D grid is represented in the given coordinate system;
  creating a 3D data structure comprising a plurality of nodes, each node representing a corresponding convex-polyhedral region of the 3D space occupied by the given real-world environment;
  determining 3D positions of pixels of the visible-light images in the given coordinate system, based on the 3D positions of corresponding view points from which the visible-light images are captured;
  dividing each visible-light image into a plurality of portions, wherein 3D positions of pixels of a given portion of said visible-light image fall inside a corresponding convex-polyhedral region of the 3D space; and
  storing, in each node of the 3D data structure, corresponding portions of the visible-light images whose pixels' 3D positions fall inside a corresponding convex-polyhedral region of the 3D space.

In a second aspect, an embodiment of the present disclosure provides a system comprising:
  at least one visible-light camera; and
  at least one server configured to:
    receive visible-light images of a given real-world environment captured by the at least one visible-light camera from a plurality of view points in the given real-world environment, wherein 3D positions of the plurality of view points are represented in a given coordinate system;
    divide a 3D space occupied by the given real-world environment into a 3D grid of convex-polyhedral regions, wherein the 3D grid is represented in the given coordinate system;
    create a 3D data structure comprising a plurality of nodes, each node representing a corresponding convex-polyhedral region of the 3D space occupied by the given real-world environment;
    determine 3D positions of pixels of the visible-light images in the given coordinate system, based on the 3D positions of corresponding view points from which the visible-light images are captured;

divide each visible-light image into a plurality of portions, wherein 3D positions of pixels of a given portion of said visible-light image fall inside a corresponding convex-polyhedral region of the 3D space; and store, in each node of the 3D data structure, corresponding portions of the visible-light images whose pixels' 3D positions fall inside a corresponding convex-polyhedral region of the 3D space.

In a third aspect, an embodiment of the present disclosure provides a computer program product comprising a non-transitory machine-readable data storage medium having stored thereon program instructions that, when executed by a processor, cause the processor to:

receive visible-light images of a given real-world environment captured by at least one visible-light camera from a plurality of view points in the given real-world environment, wherein 3D positions of the plurality of view points are represented in a given coordinate system;

divide a 3D space occupied by the given real-world environment into a 3D grid of convex-polyhedral regions, wherein the 3D grid is represented in the given coordinate system;

create a 3D data structure comprising a plurality of nodes, each node representing a corresponding convex-polyhedral region of the 3D space occupied by the given real-world environment;

determine 3D positions of pixels of the visible-light images in the given coordinate system, based on the 3D positions of corresponding view points from which the visible-light images are captured;

divide each visible-light image into a plurality of portions, wherein 3D positions of pixels of a given portion of said visible-light image fall inside a corresponding convex-polyhedral region of the 3D space; and store, in each node of the 3D data structure, corresponding portions of the visible-light images whose pixels' 3D positions fall inside a corresponding convex-polyhedral region of the 3D space.

The present disclosure provides the aforementioned computer-implemented method, the aforementioned system, and the aforementioned computer program product. The method creates the 3D data structure in a manner that it can be effectively used to reconstruct visible-light images from perspectives of various view points. Such reconstruction of the visible-light images is feasible in real time at arbitrary resolution, and provides significant image quality improvement as compared to existing techniques for image reconstruction. As a result, the (reconstructed) visible-light images have high resolution (i.e., high quality) and can be used for various applications which require real-time image reconstruction such as virtual teleportation. The data structure described herein is suitable to be employed for both static environments, as well as dynamic environments, and are able to capture high detail geometry. As a result, the data structure is usable for applications requiring fine representation, as well as for applications requiring coarse representation. Moreover, eye-dependent lighting such as specular highlights and mirror reflections are also reproduced correctly in the (reconstructed) visible-light images. Furthermore, thin objects present in the given real-world environment are reconstructed well. The system described herein is easy to implement, easy to use, and supports real-time high-quality image reconstruction.

Throughout the present disclosure, the term "visible-light camera" refers to an equipment that is operable to detect and process signals, such as visible-light signals, received from the given real-world environment, so as to capture the visible-light images of the given real-world environment. Each visible-light image represents visual content of the given real-world environment. The term "visual content" encompasses not only colour information of real objects present in the given real-world environment, but can also encompass other attributes associated with the real objects (for example, such as depth information, transparency information, luminance information, and the like). Examples of the at least one visible-light camera include, but are not limited to, a Red-Green-Blue (RGB) camera, a Red-Green-Blue-Alpha (RGB-A) camera, a Red-Green-Blue-Depth (RGB-D) camera, and a monochrome camera. In an example, the at least one visible-light camera may be the RGB camera, and the visible-light images may comprise RGB texture data.

Optionally, the at least one visible-light camera comprises at least one depth sensor. In such a case, the visible-light images also represent optical depths of the real objects present in the given real-world environment. For example, in such a case, the at least one visible-light camera is implemented as at least one Red-Green-Blue-Depth (RGB-D) camera. The at least one depth sensor may be implemented as a light-based depth sensor, a sound-based depth sensor, or similar. Such depth sensors are well known in the art.

Optionally, the system further comprises at least one depth camera. The at least one depth camera captures at least one depth image representing optical depths of the real objects present in the given real-world environment. Optionally, the at least one depth camera comprises at least one depth sensor for capturing the at least one depth image. Examples of at least one depth camera include, but are not limited to, a Red-Green-Blue-Depth (RGB-D) camera, a stereo camera, a ranging camera, a Light Detection and Ranging (LiDAR) camera, a flash LiDAR camera, a Time-of-Flight (ToF) camera, a Sound Navigation and Ranging (SONAR) camera, a laser rangefinder, a plenoptic camera, an infrared camera. In an example, the at least one depth camera may be the stereo camera, and a given depth image may comprise RGB-D texture data.

The at least one server controls an overall operation of the system. The at least one server is communicably coupled to the at least one visible-light camera. Optionally, the at least one server is communicably coupled to the at least one depth sensor and/or the at least one depth camera. Optionally, the at least one server is communicably coupled to one or more client devices. A given client device, in operation, requests the at least one server to utilize the 3D data structure (representing the given real-world environment) for generating visible-light images to be displayed at the client device. In a client-server relationship, the client device acts as a service or resource requester and the at least one server acts as the service or resource provider. Optionally, the client device is implemented as a display apparatus. The "display apparatus" is a specialized equipment that is to configured to present an extended-reality (XR) environment to a user when the display apparatus in operation is worn by the user on his/her head. In such an instance, the display apparatus acts as a specialized device (for example, such as an XR headset, a pair of XR glasses, and the like) that is operable to present a visual scene of the XR environment to the user. Commonly, the "display apparatus" is referred to as "head-mounted display apparatus", for the sake of convenience only. Throughout the present disclosure, the term "extended-reality" encompasses virtual reality (VR), augmented reality (AR), mixed reality (MR), and the like.

In an embodiment, the at least one server is implemented as a processor of a computing device. The computing device is communicably coupled to the client device wirelessly and/or in a wired manner. Examples of the computing device include, but are not limited to, a laptop computer, a desktop computer, a tablet computer, a phablet, a personal digital assistant, a workstation, a console. In such an embodiment, the at least one visible-light camera may be arranged on another device (such as the display apparatus, a drone, a robot, a vehicle, and the like) which is separate from the computing device. In another embodiment, the at least one server is implemented as a part of a device that also includes the at least one visible-light camera.

It will be appreciated that the term "at least one serve" refers to "a single server" in some implementations, and to "a plurality of servers" in other implementations. When the system comprises the single server, all operations of the system are performed by the single server. When the system comprises the plurality of servers, different operations of the system are performed by different (specially configured) servers from amongst the plurality of servers. Optionally, a given server is implemented as a Graphics Processing Unit (GPU).

The visible-light images are captured from the plurality of view points, so as to represent the visual content of the given real-world environment from various perspectives. In order to capture the visible-light images, the at least one visible-light camera is moved (either manually, or using control signals) to the plurality of view points in the given real-world environment. The at least one server receives the visible-light images from the at least one visible-light camera. The given coordinate system defines positions within the 3D space occupied by the given real-world environment. Optionally, the given coordinate system has a predefined origin and three mutually perpendicular coordinate axes. The three mutually perpendicular coordinate axes could be, for example, X, Y, and Z axes. Optionally, in this regard, the 3D positions of the plurality of view points in the given coordinate system are expressed as (x, y, z) position coordinates along the X, Y and Z axes, respectively.

Optionally, the 3D space occupied by the given real-world environment is divided into the 3D grid of convex-polyhedral regions using a space partitioning scheme. Examples of the space partitioning scheme include, but are not limited to, Octree (including Sparse Voxel Octrees) Partitioning, Binary Space Partitioning, Quadtree Partitioning, Bounding volume hierarchical partitioning, and voxel hashing. The 3D grid of convex-polyhedral regions enables in effectively modelling the 3D space.

Throughout the present disclosure, the term "convex-polyhedral region" refers to a region that is shaped as a polyhedron, wherein the polyhedron is convex. A polyhedron is said to be convex if a line segment joining any two points of the polyhedron lies inside a surface of the polyhedron. In other words, a polyhedron is said to be convex if its polygonal faces are convex (i.e., bulging outwards). Examples of the convex-polyhedral regions include, but are not limited to, cubes, cuboids, convex dodecahedrons, and convex icosahedrons.

It will be appreciated that the 3D grid of convex-polyhedral regions may be a regular grid or an irregular grid. The regular grid is easier to employ, because its tessellation is regular. However, in case of the irregular grid, information indicating sets of vertices that form individual convex-polyhedral regions is required to determine which vertices are common between which convex-polyhedral regions. In such a case, the at least one server is further configured to generate said information.

In an embodiment, the convex-polyhedral regions are of a same size. Such equi-sized convex-polyhedral regions may be employed when the 3D grid of convex-polyhedral regions is the regular grid.

In another embodiment, the convex-polyhedral regions are of varying sizes. The variation in size of the convex-polyhedral regions may be random, linear, non-linear, exponential, or similar. Moreover, optionally, a size of a given convex-polyhedral region is determined dynamically, based on an availability and a quality of the visible-light images (i.e., an input data for the at least one server) representing the given convex-polyhedral region. Greater a number of available visible-light images representing the given convex-polyhedral region, smaller is the size of the given convex-polyhedral region, and vice versa. Higher the quality of the visible-light images representing the given convex-polyhedral region, smaller is the size of the given convex-polyhedral region, and vice versa. Herein, a quality of the visible-light images can be determined based on a number of view points from which the visible-light images are captured. In this regard, greater the number of the view points, higher is the quality of the visible-light images, and vice versa. As an example, when the given convex-polyhedral region includes complex geometry (and especially, self-occluding geometry), said region has a small size as the complex geometry would be determined upon said region being represented in a high number of (captured) visible-light images. In such a case, different visible-light images captured from different view points may reveal a significant number of pixels corresponding to features that are occluded in other visible-light images.

Optionally, a length of a side of a given convex-polyhedral region lies in a range of 1 centimetre to 10 metre. As an example, the 3D space may be divided into 200 cubes. Out of these, 50 convex cubes may have each side measuring 20 centimetres, 70 convex cubes may have each side measuring 50 centimetres and 80 convex cubes may have each side measuring 100 centimetres (or 1 metre).

Optionally, the step of dividing the 3D space comprises:
initially dividing the 3D space into the convex-polyhedral regions of varying sizes, wherein a size of a given convex-polyhedral region is a function of a distance of the given convex-polyhedral region from at least one initial view point from which initial visible-light images are captured;
identifying, based on new visible-light images captured from at least one new view point, at least one convex-polyhedral region that includes at least one object having a self-occluding geometry; and
iteratively dividing the at least one convex-polyhedral region into smaller convex-polyhedral regions.

In this regard, the (initial) variation in sizes of the convex-polyhedral regions depends on distances of the convex-polyhedral regions from initial view point(s) from which the initial visible-light images are captured. Greater the distance of the given convex-polyhedral region from the at least one initial view point, greater is the size of the given convex-polyhedral region, and vice versa. The new visible-light images are captured later in time than the initial visible-light images. Optionally, the at least one new view point is closer to the given convex-polyhedral region than the at least one initial view point. In this regard, the at least one convex-polyhedral region is iteratively divided into smaller convex-polyhedral regions as the at least one visible-light camera moves closer to the at least one object having the self-occluding geometry, for providing an increased accuracy of reconstructing the at least one object using the 3D data structure. When the at least one visible-light camera moves closer to the at least one object, pixels corresponding to previously-occluded portions of the at least one object may become visible, thereby providing a higher quality of the new visible-light images as compared to that of the initial visible-light images. By the phrase "the at least one object having the self-occluding geometry", it is meant that a geometry of the at least one object is such that when the at least one object is viewed from different view points, different portions of the at least one object occlude at least one of other portions of the at least one object.

The 3D data structure, when utilized, enables image-based environment reconstruction of the given real-world environment. Examples of the 3D data structure include, but are not limited to, an octree (including Sparse Voxel Octrees), a Binary Space Partitioning tree, a Quadtree, a Bounding volume hierarchy, and hashed voxels. It will be appreciated that a number of nodes in the 3D data structure is equal to a number of the convex-polyhedral regions. Moreover, a given real-world region (represented by at least one pixel) may be stored in more than one node of the 3D data structure.

Optionally, at least one formula pertaining to coordinate geometry is employed to determine the 3D position of the pixel of the given visible-light image. Such formulas are well-known in the art. In an embodiment, a 3D position of a pixel of a given visible-light image is determined based on an optical depth of said pixel and a 3D position of a given view point from which the given visible-light image is captured, wherein the optical depth of the pixel is determined:

using stereo disparity (between the given visible-light image and another visible-light image); or from a depth image captured by at least one depth sensor from the given view point.

In another embodiment, a 3D position of a pixel of a given visible-light image is determined by utilising a 3D environment model of the given real-world environment, based on a given view point from which the given visible-light image is captured. Optionally, the 3D environment model is pre-made (by the at least one server or another server or processor) and is stored at a data repository that is coupled in communication with the at least one server. The data repository could be implemented as a cloud-based memory, a memory of the system, a memory of the at least one server, or similar. The 3D environment model is accessed to identify therein the given view point and a location represented by the pixel. Then, the 3D position of the pixel is determined based on a 3D position of the given view point and a distance between the given view point and said location.

Each visible-light image is divided into the plurality of portions, based on the 3D positions of pixels of said visible-light image. Such a division may be understood to be a classification operation that classifies pixels of each visible-light image to belong to their corresponding convex-polyhedral regions of the 3D space. A number of portions into which a given visible-light image is divided may be less than or equal to a total number of the convex-polyhedral regions in the 3D space. This is so because the given visible-light image may not necessarily represent the entire 3D space occupied by the real-world environment. It will be appreciated that a given portion of the given visible-light image may be a continuous portion (i.e., all pixels belonging to this portion are located together in the given visible-light image) or a discontinuous portion (i.e., pixels belonging to this portion are located disjointly in the given visible-light image).

Next, all nodes of the 3D data structure are populated to enable image-based real time environment reconstruction and resynthesis. The contents of a given node include at least all those portions of the visible-light images whose pixels have 3D positions lying within a convex-polyhedral region (of the 3D space) corresponding to the given node. These portions of the visible-light images represent contents of the given node as seen from at least one direction. The pixels of the portions of the visible-light images stored in the given node serve as samples that fall inside boundaries of the given node.

Optionally, for a visible-light image captured from a given view point, each portion of the visible-light image is stored in a corresponding node along with orientation information pertaining to said portion. The orientation information pertaining to a given portion of the visible-light image indicates direction(s) corresponding to perspective(s) from which the given portion can be represented and stored in the 3D data structure. Storing the orientation information is beneficial since the orientation information is utilized for generating a perspective-correct representation of the given portion at a time of reconstructing visible-light images using the 3D data structure. It will be appreciated that the given portion of the visible-light image includes colour and depth data, meaning that the given portion is in fact a height field of colour samples. Therefore, the orientation information pertaining to the given portion is indicative of an axis of the depth data in the given portion.

Optionally, the orientation information indicates at least one of:

(i) (i) a direction of a depth axis of the visible-light image from the given view point, (ii) (ii) a view direction from the given view point to a corresponding convex-polyhedral region, (iii) (iii) a direction perpendicular to a real surface that is present in the corresponding convex-polyhedral region and represented in said portion, (iv) (iv) one of a plurality of predefined directions that matches (i), (v) (v) one of the plurality of predefined directions that matches (ii), (vi) (vi) one of the plurality of predefined directions that matches (iii).

It will be appreciated that (i)-(vi) given above are exemplary, as the orientation information could indicate an infinite number of directions. The orientation information is indicative of an orientation matrix of said portion, thereby enabling in accurately determining an orientation of said portion in the 3D space. The orientation information may be expressed as direction vectors, or as a 3*3 matrix. These representations provide the benefit of being able of choose the orientation (and specifically, a rotation) of said portion to better fit boundaries of its corresponding node (albeit at a cost of additional memory requirements for storing said portion).

Optionally, when the orientation information indicates (i), the orientation information serves as a face normal of the visible-light image. The visible-light image has only one face normal, the face normal indicating how the visible-light image is oriented in space. The face normal of the visible-light image is different from surface normals of the portions of the visible-light image. Such an orientation information is stored in an implementation where the portions of the visible-light images are stored in a form of orthographic projections. The depth axis may, for example, be a Z-axis.

Alternatively, optionally, when the orientation information indicates (ii), the orientation information represents the view direction employed by a corresponding visible-light camera for capturing the visible-light image. Such an orientation information is stored in an implementation where the portions of the visible-light images are stored in a form of perspective projections.

Yet alternatively, optionally, when the orientation information indicates (iii), the orientation information represents a surface normal of the real surface. Such an orientation information may be employed when the real surface is flat. Different real surfaces have different surface normals. Optionally, the computer-implemented method further comprises: analysing, using at least one image processing algorithm, 3D structures of real surfaces that are present in the corresponding convex-polyhedral region and are represented in said portion; and selecting the orientation information, based on the 3D structures of the real surfaces. Optionally, in this regard, when a 3D structure of a given real surface is flat, orientation information corresponding to the given real surface is selected to indicate a direction perpendicular to the given real surface. As an example, when a given portion (of a visible-light image) that is to be stored represents a straight concrete wall, the orientation information may indicate a direction perpendicular to a real surface of said wall (since concrete, being mostly diffuse, does not exhibit much view dependency and therefore the real surface of the wall looks almost the same from multiple angles).

Still alternatively, optionally, when the orientation information indicates at least one of the plurality of predefined directions that matches at least one of: (i), (ii), (iii), the orientation information represents a pre-known direction. If an exact match does not occur, a next-best match is considered. Optionally, the plurality of predefined directions comprise six directions of a three-dimensional coordinate system. Optionally, in this regard, the six directions are: positive X-axis, positive Y-axis, positive Z-axis, negative X-axis, negative Y-axis, negative Z-axis. As an example, the orientation information may indicate both the view direction from the given view point to the corresponding convex-polyhedral region and an up-axis (which may, for example, be the positive X-axis or the positive Y-axis) that matches the view direction. Optionally, face normals of the visible-light images are quantized into the plurality of predefined directions. Notably, an original direction of a given face normal is matched with each of the plurality of predefined directions, and then the original direction of the given face normal is quantized to be equal to one of the plurality of predefined directions which most closely matches (i.e., makes the smallest angle with) the original direction. The plurality of predefined directions serve as fixed set of quantization levels according to which directions of the face normal can be approximated.

Optionally, the at least one server is configured to store the 3D data structure at the data repository coupled in communication with the at least one server. Optionally, in this regard, a database of all portions of the visible-light images that are stored in the plurality of nodes is maintained at the data repository. This database is updated as required (for example, when a pre-stored portion is replaced with a new portion, when a new portion is added to the pre-stored portions, and similar).

In an embodiment, the computer-implemented method further comprises, for a visible-light image captured from a given view point, transforming each portion of the visible-light image into a corresponding orthographic projection with respect to a direction of a depth axis of the visible-light image from the given view point, prior to storing said portion in the corresponding node. Optionally, in this regard, said portion is stored in the corresponding node along with the orientation information indicating the direction of the depth axis of the visible-light image. When a given portion of the visible-light image is transformed into its corresponding orthographic projection with respect to the direction of the depth axis of the visible-light image from the given view point, features lying both near and far are of equal or nearly equal size in terms of number of pixels, as if the visible-light camera which captured the visible-light image was infinitely far away and was employing a very large zoom lens. Storing the portions of the visible-light image into orthographic projections is a very straightforward way to store the portions.

In another embodiment, the computer-implemented method further comprises, for a visible-light image captured from a given view point, reprojecting each portion of the visible-light image from a perspective of orientation information, prior to storing said portion in the corresponding node. Optionally, in this regard, said portion is stored in the corresponding node along with the orientation information. Optionally, the step of reprojecting is performed based on at least one of: orientation information pertaining to said portion, the 3D structures of real surfaces that are present in the corresponding convex-polyhedral region and are represented in said portion, one of the plurality of predefined directions. Algorithms for reprojecting image portions are well known in the art. It will be appreciated that as new visible-light images keep being captured for refining the 3D data structure, there may be identified some pre-stored portions of previously-captured visible-light images in the plurality of nodes of the 3D data structure that accurately represent static parts of the given real-world environment. In such a case, reprojection may not be required for those portions of the new visible-light images which represent these static parts. Rather, visual content in the new visible-light images may be used to accumulate and refine the pre-stored portions.

Optionally, the computer-implemented method further comprises, for a given view point from a perspective of which a given visible-light image is to be reconstructed using the 3D data structure,
  determining a set of visible nodes whose corresponding convex-polyhedral regions are visible from the given view point;
  for a given visible node of said set, selecting, from amongst portions of the visible-light images stored in the given visible node, a portion of a visible-light image whose orientation information indicates at least one direction which matches a direction of a given depth axis of the given visible-light image from the given view point or a view direction from the given view point to a convex-polyhedral region corresponding to the given visible node; and
  reconstructing the given visible-light image from individual portions of the visible-light images that are selected for each visible node of said set.

In this regard, the set of visible nodes whose corresponding convex-polyhedral regions are visible from the given view point may be determined as nodes lying along a given view direction defining the perspective from the given view point. The set of visible nodes comprises at least one node. Prior to determining the set of visible nodes, the given view point is received by the at least one server, from the client device. The client device, in operation, sends a request to the at least one server, for reconstructing the given visible-light image from the perspective of the given view point, using the 3D data structure. Upon performing the reconstruction, the at least one server sends the given visible-light image to the client device.

It will be appreciated that the selection of the portion of the visible-light image that is to be used for reconstructing is optionally made based on how well the at least one direction indicated by the orientation information of the portion matches: the direction of the given depth axis of the given visible-light image from the given view point (in case of orthographic projections), or the view direction from the given view point to the convex-polyhedral region corresponding to the given visible node (in case of perspective projections). If an exact match does not occur, a next-best match is considered, and so on. This is done because a portion representing one view that is close-but-not-quite to that of the (requested) given view direction might have occluded areas (due to orthographic projection or differences in perspective) that are captured in other portions representing other views. Therefore, when selecting the individual portions of the visible-light images for reconstruction, all the portions of the visible-light images stored in the given visible node are checked for matching of their orientation information. All the portions can be considered to collectively constitute a texture atlas of the given visible node. The step of reconstructing the given visible-light image is performed in a computationally efficient manner, as described below.

Optionally, the step of reconstructing comprises warping the individual portions of the visible-light images that are selected for each visible node of said set to generate the given visible-light image. Optionally, in this regard, the individual portions of the visible-light images that are selected are warped through six degrees of freedom (6DOF) in the 3D space occupied by the given real-world environment. Optionally, when warping the individual portions of the visible-light images that are selected, the at least one server is configured to employ at least one image reprojection algorithm. The at least one image reprojection algorithm comprises at least one spacewarping algorithm. The at least one image reprojection algorithm takes into account a plurality of factors for generating the given visible-light image. The plurality of factors comprise, for example, a resolution of a light source by which the given visible-light image is to be displayed, a frame rate of displaying a sequence of generated visible-light images, and the like. Such image reprojection algorithms are well-known in the art.

It will be appreciated that when the given view point from the perspective of which the given visible-light image is to be reconstructed using the 3D data structure does not lie amongst the plurality of view points from which the visible-light images of the given real-world environment were previously captured, the computer-implemented method described herein optionally warps existing portions of the visible-light images stored in the 3D data structure to generate the given visible-light image. However, conventional techniques employing 3D point clouds, 3D meshing, or similar, employ different techniques for reconstruction and would display individual points, show geometry edges, or similar, respectively.

Optionally, when reconstructing the given visible-light image, the at least one server is configured to manage a memory utilization using virtual texturing. In this regard, the at least one server is configured to: determine at least one node whose corresponding convex-polyhedral region is visible from the given view point but lies at a distance greater than a predefined threshold distance from the given view point; and offload high-resolution portions of the visible-light images stored in the at least one node to an external memory, wherein the external memory is communicably coupled to the at least one server. These high-resolution portions may be in a form of high-resolution mipmaps. The external memory is a memory that is different from the data repository at which the 3D data structure is stored. Examples of the external memory include, but are not limited to, a local memory of the at least one server, a removable memory (for example, a solid-state drive (SSD)), and a cloud-based memory. Herein, the phrase "offload the high-resolution portions" means that the high-resolution portions are replaced with their low-resolution counterparts (since these low-resolution counterparts consume less memory than the high-resolution portions). Optionally, the at least one server is further configured to calculate a (required) low resolution (using a method which is identical to existing MIP Level-of-detail calculation methods used in GPUs). In this regard, the at least one server calculates the nearest power-of-2 scale factor of the (original) high-resolution image so that the size of one texel, when rendered on a target display, most closely matches the size of one display pixel (therefore minimizing oversampling and undersampling).

Moreover, optionally, the computer-implemented method further comprises:

for each new visible-light image that is captured from a given view point, performing the step of determining 3D positions of pixels of the new visible-light image, the step of dividing the new visible-light image into a plurality of new portions and the step of storing in a given node a corresponding new portion of the new visible-light image whose pixels' 3D positions fall inside a corresponding convex-polyhedral region;

determining whether or not a 3D position of a given pixel of the new visible-light image lies in a proximity of a boundary between adjacent convex-polyhedral regions, wherein the 3D position of the given pixel has been determined to fall inside one of the adjacent convex-polyhedral regions; and when the 3D position of the given pixel lies in the proximity of the boundary, checking whether or not the given pixel is included in at least one previous portion of at least one previous visible-light image stored previously in a node corresponding to another of the adjacent convex-polyhedral regions; and correcting a previous division of the at least one previous visible-light image to store a part of the at least one previous portion that includes the given pixel in a node corresponding to the one of the adjacent convex-polyhedral regions, instead of the node corresponding to the another of the adjacent convex-polyhedral regions.

In this regard, the steps of determining the 3D positions of pixels of the new visible light image, dividing the new visible-light image, and storing in the given node are performed in a manner similar to that described earlier. The term "new visible-light image" refers to a visible-light image which is captured after (i.e., later in time than) a first instance of storing data in each node of the 3D data structure. It will be appreciated that boundaries of the convex-polyhedral regions in the 3D grid are pre-known, as the division of the 3D space into the 3D grid is performed previously (by the at least one server). The 3D position of the given pixel of the new visible-light image is determined to lie in the proximity of the boundary between adjacent convex-polyhedral regions when the 3D position lies within a noise level distance from the boundary. This noise level distance is determined based on properties of a given depth sensor (for example, such as a ToF sensor) that is employed to determine the 3D position of the given pixel of the new visible-light image. The noise level distance lies in a range of 0.5% to 5% of a distance to a target. The noise level distance may be from 0.5, 1, 1.5, 2.5, or 3.5% of the distance to the target up to 2, 3, 4, 4.5, or 5% of the distance to the target. For example, the noise level distance of the given depth sensor may be in the order of 1% of the distance to the target. In such a case, when the distance to the target is 4 metres, the noise level distance (i.e., measurement error) is +/−4 centimetres. When the 3D position of the given pixel lies in the proximity of the boundary and the given pixel is included in the at least one previous portion of the at least one previous visible-light image stored previously in the node corresponding to another of the adjacent convex-polyhedral regions, it means that a previous division of the at least one previous visible-light image is not entirely correct at a present time and requires updating. In such a case, the previous division is corrected such that the part of the at least one previous portion that includes the given pixel is now stored in the (correct) node corresponding to the one of the adjacent convex-polyhedral regions. In this way, the 3D data structure is dynamically updated to improve its accuracy, thereby subsequently improving a quality of reconstruction performed using the 3D data structure.

Optionally, the computer-implemented method further comprises:
- for a given node of the 3D data structure, determining whether the portions of the visible-light images stored previously in the given node are sufficient to accurately reconstruct visual content of the visible-light images, based on at least one of:
- an angle formed between a given view direction from a given view point from which a new visible-light image is to be captured to a corresponding convex-polyhedral region and a face normal that most closely matches the given view direction, said face normal being selected from amongst a set of face normals associated with the visible-light images;
- an extent of matching between face normals associated with the visible-light images and a distribution of pixel normals of non-occluded pixels in the portions of the visible-light images stored previously in the given node;
- a quality of reproducing colour information and geometry of a given visible-light image using the portions of the visible-light images, wherein the given visible-light image is to be reconstructed using the 3D data structure;
- when it is determined that the portions of the visible-light images stored previously in the given node are sufficient to accurately reconstruct visual content of the visible-light images, stopping capture of new visible-light images that represent the portions of the visible-light images stored previously in the given node; and
- when it is determined that the portions of the visible-light images stored previously in the given node are not sufficient to accurately reconstruct visual content of the visible-light images,
- capturing a new visible-light image from a given view point, wherein the new visible-light image represents at least one of the portions of the visible-light images stored previously in the given node which is not sufficient to accurately reconstruct visual content of the visible-light images,
- dividing the new visible-light image into a plurality of new portions,
- determining at least one new portion of the new visible-light image that corresponds to the at least one of the portions of the visible-light images stored previously, and
- storing the at least one new portion of the new visible-light in the given node.

In this regard, decisions of whether to capture new visible-light images, as well as view directions and resolutions with which the new visible-light images are to be captured are made based on whether the portions of the visible-light images stored previously in the given node are sufficient to accurately reconstruct visual content of the visible-light images. Other factors in addition to the three above-mentioned factors may also be employed when making these decisions. Smaller the angle formed between the given view direction from the given view point from which the new visible-light image is to be captured to the corresponding convex-polyhedral region (and optionally, a centre of the given node) and the face normal that most closely matches the given view direction, higher is the sufficiency of the portions of the visible-light images stored previously in the given node in terms of accurately reconstructing the visual content of the visible-light images, and vice versa. Greater the extent of matching between the face normals associated with the visible-light images and the distribution of pixel normals of non-occluded pixels in the portions of the visible-light images stored previously in the given node, higher is the sufficiency of the portions of the visible-light images stored previously in the given node in terms of accurately reconstructing the visual content of the visible-light images, and vice versa. A given pixel normal of a given pixel indicates an orientation of a real-world region represented by the given pixel in space. Lastly, higher the quality of reproducing colour information and geometry of the given visible-light image using the portions of the visible-light images, higher is the sufficiency of the portions of the visible-light images stored previously in the given node in terms of accurately reconstructing the visual content of the visible-light images, and vice versa. Notably, higher the sufficiency of the portions of the visible-light images stored previously in the given node in terms of accurately reconstructing the visual content of the visible-light images, lesser is the requirement for capturing new visible-light images representing said portions and of storing new portions of such new visible-light images in the 3D data structure.

As an example, when a given portion of a given visible-light image stored previously in the given node represents an edge whereat two surfaces meet at a 90 degrees angle (i.e., a corner of a room whereat two walls meet) as well as the two surfaces, the given portion alone may not be sufficient in terms of accurately reconstructing this visual content. In such a case, it would be required to have (at least) two portions representing this visual content, wherein each portion represents one of the two surfaces along with edges/regions surrounding the one of the two surfaces (so that there is provided some wiggle room in terms of creation of new portions, with respect to the effects of noise and other inaccuracies). Therefore, two new visible-light images may be captured whose face normals match the distribution of pixel normals of non-occluded pixels in the given portion of the given visible-light image stored previously. In particular, a face normal of a given new visible-light image may match a distribution of pixel normals of pixels representing a given surface amongst the two surfaces.

Optionally, the computer-implemented method further comprises:

for each new visible-light image that is captured from a given view point, performing the step of determining 3D positions of pixels of the new visible light image and the step of dividing the new visible-light image into a plurality of new portions; and for a given node of the 3D data structure, selecting at least one of the portions of the visible-light images stored previously in the given node that matches a corresponding new portion of the new visible-light image;

determining whether to store the corresponding new portion of the new visible-light image in the given node, or to reuse the at least one of the portions of the visible-light images stored previously, based on at least one of:

a number of occluded pixels in the corresponding new portion and a number of occluded pixels in the at least one of the portions of the visible-light images, an age of the at least one of the portions of the visible-light images, a resolution of the corresponding new portion and a resolution of the at least one of the portions of the visible-light images, an angle formed between at least one direction indicated by orientation information pertaining to the corresponding new portion and at least one direction indicated by orientation information pertaining to the at least one of the portions of the visible-light images, a number of pixels that would be occluded if one of the corresponding new portion and the at least one of the portions of the visible-light images is projected onto another of the corresponding new portion and the at least one of the portions of the visible-light images; and storing the corresponding new portion of the new visible-light in the given node or reusing the at least one of the portions of the visible-light images stored previously, based on said determining.

In this regard, the steps of determining the 3D positions of pixels of the new visible light image and dividing the new visible-light image are performed in a manner similar to that described earlier (with respect to the visible-light images). Optionally, all the portions of the visible-light images stored previously in the given node are matched with the corresponding new portion of the new visible-light image, and only that/those portion(s) is/are selected which have a closest match with the corresponding new portion. Such matching can be performed by: identifying those portions from amongst all the portions stored previously in the given node whose orientation information matches with orientation information of the corresponding new portion, then comparing shapes of the identified portions with a shape of the corresponding new portion, and then comparing pixel data of the identified portions with pixel data of the corresponding new portion in a pixel-by-pixel manner. Next, at least one parameter (described later in detail) is analysed to evaluate which of the at least one of the portions of the visible-light images stored previously or the corresponding new portion of the new visible-light image is more useful and relevant than the other in terms of representing the visual content of the given real-world environment, for accurately enriching the 3D data structure. If the corresponding new portion of the new visible-light image is determined to be more useful and relevant as compared to the at least one of the portions of the visible-light images, the former replaces the latter to now be stored in the given node; otherwise, the latter is reused (i.e., it continues to be stored in the given node).

Optionally, when determining whether to store the corresponding new portion of the new visible-light image in the given node, or to reuse the at least one of the portions of the visible-light images stored previously, the at least one server is configured to calculate a quality score based on the at least one parameter, wherein:

if the quality score is higher than a predefined threshold, the corresponding new portion of the new visible-light image is stored in the given node; and if the quality score is equal to or lower than the predefined threshold, the at least one of the portions of the visible-light images stored previously is reused and continues to be stored in the given node.

It will be appreciated that the quality score may lie in any suitable range, for example, such as a range of 0 to 1, a range of 0 to 10, a range of 0-100, and so on. Correspondingly, the predefined threshold is selected to have a certain value that depends on the range in which the quality score lies. Optionally, the predefined threshold is selected as an intermediate value lying with the range of the quality score. For example, the predefined threshold may be 0.4, when the quality score lies in the range of 0 to 1.

Optionally, the quality score is a function of the at least one parameter. Optionally, when the at least one parameter comprises a plurality of parameters, the quality score is a weighted sum of a value of each parameter. A manner in which the at least one parameter impacts the quality score is described as follows. When the number of occluded pixels in the corresponding new portion is lesser than the number of occluded pixels in the at least one of the portions of the visible-light images, it means that the corresponding new portion represents more visual content as compared to the at least one of the portions of the visible-light images, so this increases the quality score, and vice versa. The "age" of a given portion of a given visible-light image is a length of time for which the given portion has existed (i.e., has been captured in the given visible-light image). Greater the age of the given portion, higher is a likelihood that visual content represented by the given portion is obsolete, so this decreases the quality score, and vice versa. When the resolution of the corresponding new portion is higher than the resolution of the at least one of the portions of the visible-light images, it means that the corresponding new portion represents visual content at a higher quality as compared to the at least one of the portions of the visible-light images, so this increases the quality score, and vice versa. When the angle formed between the at least one direction indicated by the orientation information pertaining to the corresponding new portion and the at least one direction indicated by the orientation information pertaining to the at least one of the portions of the visible-light images is small, it means that perspectives of the corresponding new portion and the at least one of the portions of the visible-light images are similar, so this increases the quality score, and vice versa. When a number of pixels that would be occluded if the corresponding new portion is projected onto the at least one of the portions of the visible-light images is less than a number of pixels that would be occluded if the at least one of the portions of the visible-light images is projected onto the corresponding new portion, it means that using the corresponding new portion for projection would finally represent more visual content as compared to using the at least one of the portions of the visible-light images for projection, so this increases the quality score, and vice versa.

In this way, the 3D data structure is automatically updated based on the at least one parameter, and can be employed for modelling both static environments and dynamic environments.

Optionally, the corresponding new portion is stored in the given node when the at least one of the portions of the visible-light images reprojected into the given (new) view point has a high error as compared to a view represented by the corresponding new portion. This error can be measured, for example, in terms of Mean Squared Error (MSE).

Optionally, the computer-implemented method further comprises:
- for each new visible-light image that is captured from a given view point, performing the step of determining 3D positions of pixels of the new visible-light image, the step of dividing the new visible-light image into a plurality of new portions and the step of storing in a given node a corresponding new portion of the new visible-light image whose pixels' 3D positions fall inside a corresponding convex-polyhedral region; and
- projecting pixels of the corresponding new portion of the new visible-light image onto pixels of at least one of the portions of the visible-light images stored previously in the given node whose orientation information matches with orientation information of the corresponding new portion, thereby updating the at least one of the portions of the visible-light images in the given node.

In this regard, the steps that are performed prior to projecting the pixels of the corresponding new portion of the new visible-light image, are performed in a manner similar to that described earlier (with respect to the visible-light images). Orientation information of a given portion of a given visible-light image stored previously in the given node need not perfectly (i.e., exactly) match with the orientation information of the corresponding new portion. However, a close match between these orientation information indicates perspective similarity which means that the given portion of the given visible-light image represents a similar spatial region of the 3D space occupied by the given real-world environment as the corresponding new portion. Therefore, upon matching of these orientation information, the pixels of the corresponding new portion of the new visible-light image are projected onto pixels of the given portion of the given visible-light image stored previously in the given node, in order to update the given portion to represent latest visual content. In this way, the 3D data structure is dynamically updated and can therefore be effectively employed for modelling both static environments and dynamic environments. Optionally, when projecting the pixels of the corresponding new portion of the new visible-light image, the at least one server is configured to employ the at least one image reprojection algorithm.

Optionally, the computer-implemented method further comprises:
- for each new visible-light image that is captured from a given view point, performing the step of determining 3D positions of pixels of the new visible-light image, the step of dividing the new visible-light image into a plurality of new portions and the step of storing in a given node a corresponding new portion of the new visible-light image whose pixels' 3D positions fall inside a corresponding convex-polyhedral region;
- determining a plurality of in-between nodes whose corresponding convex-polyhedral regions lie between the corresponding convex-polyhedral region of the given node and the given view point from which the new visible-light image is captured; and
- for a given in-between node,
  - finding portions of the visible-light images stored previously in the given in-between node whose orientation information matches with the orientation information of the corresponding new portion stored in the given node; and
  - cleaning up said portions of the visible-light images stored previously in the given in-between node to prune out pixels that have been previously determined to lie in a corresponding convex-polyhedral region of the given in-between node and to be occluding the corresponding convex-polyhedral region of the given node.

In this regard, the steps that are performed prior to determining the plurality of in-between nodes, are performed in a manner similar to that described earlier (with respect to the visible-light images). A convex-polyhedral region of the given in-between node lies along a view direction extending from the given view point to the corresponding convex-polyhedral region of the given node. When the portions of the visible-light images stored previously in the given in-between node have orientation information which match (either partially or fully) with the orientation information of the corresponding new portion stored in the given node, it means that said portions at least partially occlude visual content represented in the corresponding new portion. In other words, upon such matching, said portions are found to be potential occluders of the corresponding new portion. It will be appreciated that as the corresponding convex-polyhedral region of the given node is visible in the new visible-light image, there cannot be anything occluding said region in the 3D data structure. Therefore, said portions (i.e., the potential occluders) are cleaned up to prune out (i.e., remove) pixels that have been previously determined to lie in a corresponding convex-polyhedral region of the given in-between node and to be occluding the corresponding convex-polyhedral region of the given node. These pixels represent occluding content in the given in-between node. Upon such cleaning up of said portions, an accuracy of the 3D data structure with respect to occlusion in the given real-world environment is improved.

Optionally, the computer-implemented method further comprises downscaling a given portion of a visible-light image, prior to storing in a corresponding node, when a frequency with which colour changes in the given portion of the visible-light image is less than a predefined threshold frequency. Upon downscaling, an original resolution of the given portion of the visible-light image is reduced to a new resolution, wherein the new resolution is a fraction of the original resolution. The frequency with which colour changes in the given portion of the visible-light image being less than the predefined threshold frequency means that the given portion of the visible-light image does not have significant high-frequency details. In such a case, downscaling does not significantly lower image quality, and is therefore optionally employed to efficiently manage a memory budget of the at least one server efficiently. Notably, storing the downscaled given portion of the visible-light image requires less memory as compared to storing the given portion of the visible-light image at its original resolution. This memory budget may be a memory capacity allocated at the data repository, corresponding to the at least one server. The frequency with which colour changes can be expressed in terms of error metrics (for example, such as MSE) or their derivatives (for example, such as Peak Signal-To-Noise Ratio (PSNR)). Optionally, the predefined threshold frequency is expressed in terms of PSNR and lies in a range of 30 decibels to 40 decibels. In this regard, the predefined threshold frequency may be from 30, 31, 32, 33, or 35 decibels up to 32, 34, 36, 38, 39 or 40 decibels. As an example, the predefined threshold frequency may be equal to 35 decibels.

As an example, when the given portion of the visible-light image represents a wall of solid colour, the frequency with which colour changes in the given portion of the visible-light image may be less than the predefined threshold frequency. In such a case, the given portion may be downscaled, prior to storing in the corresponding node, since its lower-resolution downscaled portion would produce sufficient image quality to depict the solid colour (having nil or minimal texture detailing). Such downscaling may be performed even if a visible-light camera which captured the visible-light image is viewing the wall closely.

Optionally, when downscaling the given portion of the visible-light image, prior to storing in the corresponding node, the at least one server is configured to employ at least one of: binning, bilinear algorithm, bicubic interpolation, nearest-neighbour interpolation, Lanczos resampling, mipmapping algorithm, guided filter downscaling algorithm.

The present disclosure also relates to the system as described above. Various embodiments and variants disclosed above, with respect to the aforementioned first aspect, apply mutatis *mutandis* to the system.

Optionally, in the system, for a visible-light image captured from a given view point, each portion of the visible-light image is stored in a corresponding node along with orientation information pertaining to said portion.

Optionally, in the system, the orientation information indicates at least one of:
 (i) (i) a direction of a depth axis of the visible-light image from the given view point,
 (ii) (ii) a view direction from the given view point to a corresponding convex-polyhedral region,
 (iii) (iii) a direction perpendicular to a real surface that is present in the corresponding convex-polyhedral region and represented in said portion,
 (iv) (iv) one of a plurality of predefined directions that matches (i),
 (v) (v) one of the plurality of predefined directions that matches (ii),
 (vi) (vi) one of the plurality of predefined directions that matches (iii).

Optionally, in the system, the at least one server is configured to, for a visible-light image captured from a given view point, transform each portion of the visible-light image into a corresponding orthographic projection with respect to a direction of a depth axis of the visible-light image from the given view point, prior to storing said portion in the corresponding node.

Optionally, in the system, the at least one server is configured to:
 receive, from a client device, a given view point from a perspective of which a given visible-light image is to be reconstructed using the 3D data structure;
 determine a set of visible nodes whose corresponding convex-polyhedral regions are visible from the given view point;
 for a given visible node of said set, select, from amongst portions of the visible-light images stored in the given visible node, a portion of a visible-light image whose orientation information indicates at least one direction which matches a direction of a given depth axis of the given visible-light image from the given view point or a view direction from the given view point to a convex-polyhedral region corresponding to the given visible node;
 reconstruct the given visible-light image from individual portions of the visible-light images that are selected for each visible node of said set; and
 send the given visible-light image to the client device.

Optionally, when reconstructing, the at least one server is configured to warp the individual portions of the visible-light images that are selected for each visible node of said set to generate the given visible-light image.

Optionally, in the system, the convex-polyhedral regions are of varying sizes.

Optionally, in the system, when dividing the 3D space, the at least one server is configured to:
 initially divide the 3D space into the convex-polyhedral regions of varying sizes, wherein a size of a given convex-polyhedral region is a function of a distance of the given convex-polyhedral region from at least one initial view point from which initial visible-light images are captured;
 identify, based on new visible-light images captured from at least one new view point, at least one convex-polyhedral region that includes at least one object having a self-occluding geometry; and
 iteratively divide the at least one convex-polyhedral region into smaller convex-polyhedral regions.

Optionally, in the system, the at least one server is configured to:
 for each new visible-light image that is captured from a given view point, determine 3D positions of pixels of the new visible-light image, divide the new visible-light image into a plurality of new portions and store in a given node a corresponding new portion of the new visible-light image whose pixels' 3D positions fall inside a corresponding convex-polyhedral region;
 determine whether or not a 3D position of a given pixel of the new visible-light image lies in a proximity of a boundary between adjacent convex-polyhedral regions, wherein the 3D position of the given pixel has been determined to fall inside one of the adjacent convex-polyhedral regions; and
 when the 3D position of the given pixel lies in the proximity of the boundary,
 check whether or not the given pixel is included in at least one previous portion of at least one previous visible-light image stored previously in a node corresponding to another of the adjacent convex-polyhedral regions; and
 correct a previous division of the at least one previous visible-light image to store a part of the at least one previous portion that includes the given pixel in a node corresponding to the one of the adjacent convex-polyhedral regions, instead of the node corresponding to the another of the adjacent convex-polyhedral regions.

Optionally, in the system, the at least one server is configured to:
 for each new visible-light image that is captured from a given view point, determine 3D positions of pixels of the new visible light image and divide the new visible-light image into a plurality of new portions; and
 for a given node of the 3D data structure,
 select at least one of the portions of the visible-light images stored previously in the given node that matches a corresponding new portion of the new visible-light image;

determine whether to store the corresponding new portion of the new visible-light image in the given node, or to reuse the at least one of the portions of the visible-light images stored previously, based on at least one of:
- a number of occluded pixels in the corresponding new portion and a number of occluded pixels in the at least one of the portions of the visible-light images,
- an age of the at least one of the portions of the visible-light images,
- a resolution of the corresponding new portion and a resolution of the at least one of the portions of the visible-light images,
- an angle formed between at least one direction indicated by orientation information pertaining to the corresponding new portion and at least one direction indicated by orientation information pertaining to the at least one of the portions of the visible-light images,
- a number of pixels that would be occluded if one of the corresponding new portion and the at least one of the portions of the visible-light images is projected onto another of the corresponding new portion and the at least one of the portions of the visible-light images; and store the corresponding new portion of the new visible-light in the given node or reuse the at least one of the portions of the visible-light images stored previously, based on said determining.

Optionally, in the system, the at least one server is configured to:
for each new visible-light image that is captured from a given view point, determine 3D positions of pixels of the new visible-light image, divide the new visible-light image into a plurality of new portions and store in a given node a corresponding new portion of the new visible-light image whose pixels' 3D positions fall inside a corresponding convex-polyhedral region; and
project pixels of the corresponding new portion of the new visible-light image onto pixels of at least one of the portions of the visible-light images stored previously in the given node whose orientation information matches with orientation information of the corresponding new portion, thereby updating the at least one of the portions of the visible-light images in the given node.

Optionally, in the system, the at least one server is configured to:
for each new visible-light image that is captured from a given view point, determine 3D positions of pixels of the new visible-light image, divide the new visible-light image into a plurality of new portions and store in a given node a corresponding new portion of the new visible-light image whose pixels' 3D positions fall inside a corresponding convex-polyhedral region;
determine a plurality of in-between nodes whose corresponding convex-polyhedral regions lie between the corresponding convex-polyhedral region of the given node and the given view point from which the new visible-light image is captured; and
for a given in-between node,
find portions of the visible-light images stored previously in the given in-between node whose orientation information matches with the orientation information of the corresponding new portion stored in the given node; and
clean up said portions of the visible-light images stored previously in the given in-between node to prune out pixels that have been previously determined to lie in a corresponding convex-polyhedral region of the given in-between node and to be occluding the corresponding convex-polyhedral region of the given node.

Optionally, in the system, the at least one server is configured to downscale a given portion of a visible-light image, prior to storing in a corresponding node, when a frequency with which colour changes in the given portion of the visible-light image is less than a predefined threshold frequency.

The present disclosure also relates to the computer program product as described above. Various embodiments and variants disclosed above, with respect to the aforementioned first aspect and second aspect, apply mutatis *mutandis* to the computer program product.

Optionally, in the computer program product, for a visible-light image captured from a given view point, each portion of the visible-light image is stored in a corresponding node along with orientation information pertaining to said portion.

Optionally, in the computer program product, the orientation information indicates at least one of:
(i) (i) a direction of a depth axis of the visible-light image from the given view point,
(ii) (ii) a view direction from the given view point to a corresponding convex-polyhedral region,
(iii) (iii) a direction perpendicular to a real surface that is present in the corresponding convex-polyhedral region and represented in said portion,
(iv) (iv) one of a plurality of predefined directions that matches (i),
(v) (v) one of the plurality of predefined directions that matches (ii),
(vi) (vi) one of the plurality of predefined directions that matches (iii).

Optionally, in the computer program product, the program instructions, when executed, cause the processor to:
receive, from a client device, a given view point from a perspective of which a given visible-light image is to be reconstructed using the 3D data structure;
determine a set of visible nodes whose corresponding convex-polyhedral regions are visible from the given view point;
for a given visible node of said set, select, from amongst portions of the visible-light images stored in the given visible node, a portion of a visible-light image whose orientation information indicates at least one direction which matches a direction of a given depth axis of the given visible-light image from the given view point or a view direction from the given view point to a convex-polyhedral region corresponding to the given visible node;
reconstruct the given visible-light image from individual portions of the visible-light images that are selected for each visible node of said set; and
send the given visible-light image to the client device.

DETAILED DESCRIPTION OF THE DRAWINGS

Referring to FIG. 1, illustrated are steps of a computer-implemented method, in accordance with an embodiment of the present disclosure. At step 102, visible-light images of a given real-world environment are captured via at least one visible-light camera from a plurality of view points in the given real-world environment, wherein 3D positions of the plurality of view points are represented in a given coordinate system. At step 104, a 3D space occupied by the given real-world environment is divided into a 3D grid of convex-polyhedral regions, wherein the 3D grid is represented in the given coordinate system. At step 106, a 3D data structure comprising a plurality of nodes is created, each node representing a corresponding convex-polyhedral region of the 3D space occupied by the given real-world environment. At step 108, 3D positions of pixels of the visible-light images are determined in the given coordinate system, based on the 3D positions of corresponding view points from which the visible-light images are captured. At step 110, each visible-light image is divided into a plurality of portions, wherein 3D positions of pixels of a given portion of said visible-light image fall inside a corresponding convex-polyhedral region of the 3D space. At step 112, in each node of the 3D data structure, there are stored corresponding portions of the visible-light images whose pixels' 3D positions fall inside a corresponding convex-polyhedral region of the 3D space.

The steps 102, 104, 106, 108, 110, and 112 are only illustrative and other alternatives can also be provided where one or more steps are added, one or more steps are removed, or one or more steps are provided in a different sequence without departing from the scope of the claims herein.

Figure 2:
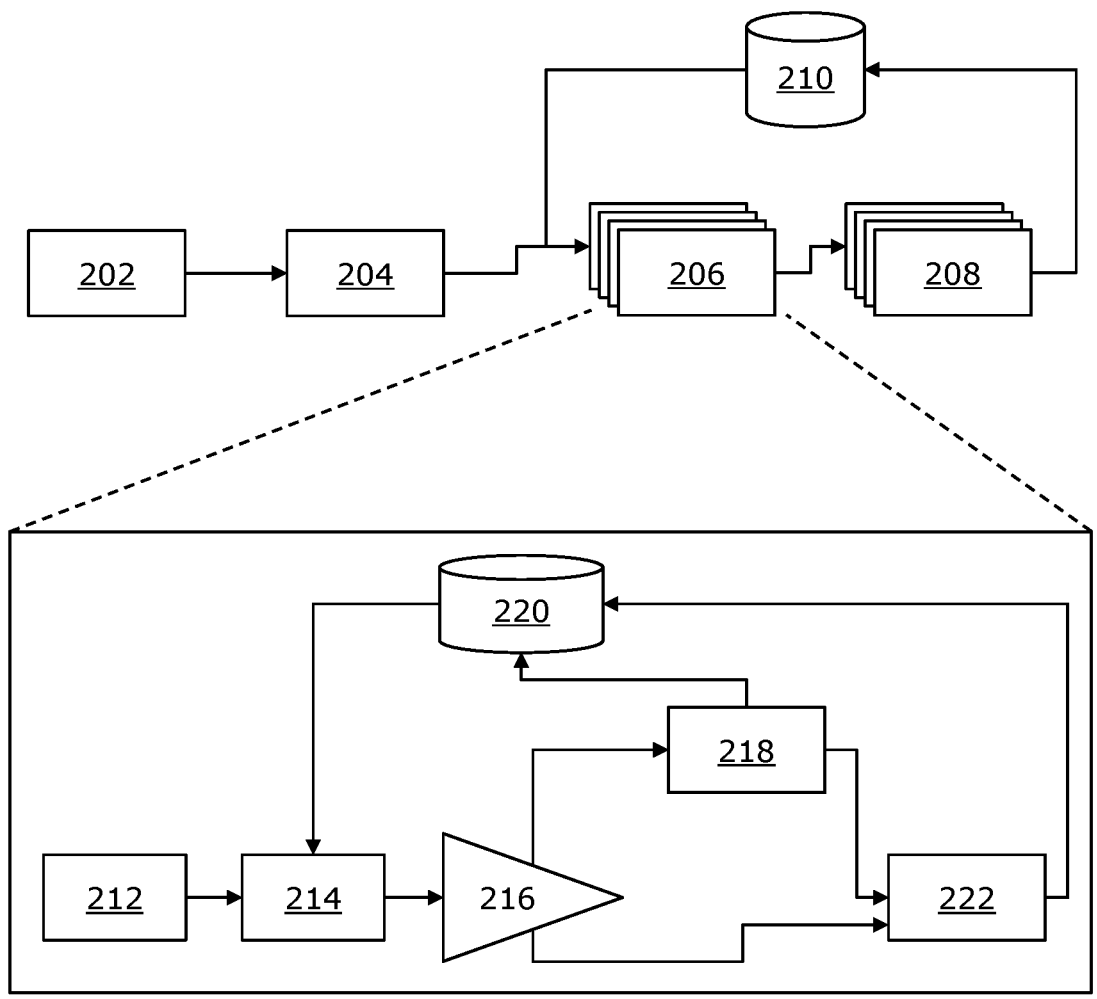
FIG. 2 illustrates an exemplary process flow in a computer implemented method, in accordance with an embodiment of the present disclosure.

Referring to FIG. 2, illustrated is an exemplary process flow in a computer implemented method, in accordance with an embodiment of the present disclosure. At 202, a new visible-light image that is captured from a given view point is received. At 204, there are performed the steps of: determining 3D positions of pixels of the new visible light image, dividing the new visible-light image into a plurality of new portions, and storing in a given node a corresponding new portion of the new visible-light image whose pixels' 3D positions fall inside a corresponding convex-polyhedral region. At 206, per-node processing is performed for each node of a 3D data structure. At 208, there are determined in-between nodes whose corresponding convex-polyhedral regions lie between the corresponding convex-polyhedral region of the given node and the given view point from which the new visible-light image is captured. For the in-between nodes, pixels that occlude the corresponding convex-polyhedral region of the given node are pruned out. At 210, the 3D data structure is employed for image reconstruction.

The per-node processing at 206 is described in detail as follows. At 212, the 3D positions of pixels of the new visible light image are available. At 214, there is selected at least one of the portions of the visible-light images stored previously in the given node that matches a corresponding new portion of the new visible-light image. At 216, there is determined whether to store the corresponding new portion of the new visible-light image in the given node, or to reuse the at least one of the portions of the visible-light images stored previously, based on at least one parameter. In other words, a quality comparison between the corresponding new portion and the at least one of the portions is performed. At 218, the corresponding new portion of the new visible-light image is stored in the given node, if it were determined to be stored at 216. At 220, a database of portions stored in the 3D data structure is updated to include the corresponding new portion of the new visible-light image. At 222, pixels of the corresponding new portion of the new visible-light image are projected onto pixels of at least one of the portions of the visible-light images stored previously in the given node whose orientation information matches with orientation information of the corresponding new portion, thereby updating the at least one of the portions of the visible-light images in the given node.

Figure 3:
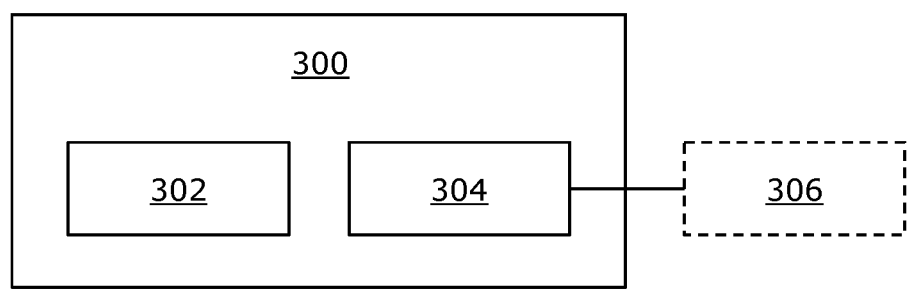
FIG. 3 illustrates a block diagram of architecture of a system, in accordance with an embodiment of the present disclosure.

Referring to FIG. 3, illustrated is a block diagram of architecture of a system 300, in accordance with an embodiment of the present disclosure. The system 300 comprises at least one visible-light camera (depicted as a visible-light camera 302), and at least one server (depicted as a server 304). The visible-light camera 302 and the server 304 are communicably coupled to each other. The server 304 is communicably coupled to a client device 306. The client device 306 may, for example, be a head-mounted extended-reality device.

FIGS. 2 and 3 are merely examples, which should not unduly limit the scope of the claims herein. A person skilled in the art will recognize many variations, alternatives, and modifications of embodiments of the present disclosure.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A computer-implemented method comprising:
   capturing visible-light images of a given real-world environment via at least one visible-light camera from a plurality of view points in the given real-world environment, wherein 3D positions of the plurality of view points are represented in a given coordinate system;
   dividing a 3D space occupied by the given real-world environment into a 3D grid of convex-polyhedral regions, wherein the 3D grid is represented in the given coordinate system;
   creating a 3D data structure comprising a plurality of nodes, each node representing a corresponding convex-polyhedral region of the 3D space occupied by the given real-world environment;
   determining 3D positions of pixels of the visible-light images in the given coordinate system, based on the 3D positions of corresponding view points from which the visible-light images are captured;
   dividing each visible-light image into a plurality of portions, wherein 3D positions of pixels of a given portion of said visible-light image fall inside a corresponding convex-polyhedral region of the 3D space; and
   storing, in each node of the 3D data structure, corresponding portions of the visible-light images whose pixels' 3D positions fall inside a corresponding convex-polyhedral region of the 3D space,
   wherein for a visible-light image captured from a given view point, each portion of the visible-light image is stored in a corresponding node along with orientation information pertaining to said portion,
   the computer-implemented method further comprising, for a given view point from a perspective of which a given visible-light image is to be reconstructed using the 3D data structure,
   determining a set of visible nodes whose corresponding convex-polyhedral regions are visible from the given view point;
   for a given visible node of said set, selecting, from amongst portions of the visible-light images stored in the given visible node, a portion of a visible-light image whose orientation information indicates at least one direction which matches a direction of a given depth axis of the given visible-light image from the given view point or a view direction from the given view point to a convex-polyhedral region corresponding to the given visible node; and reconstructing the given visible-light image from individual portions of the visible-light images that are selected for each visible node of said set, wherein the step of reconstructing comprises warping the individual portions of the visible-light images that are selected for each visible node of said set to generate the given visible-light image.

2. The computer-implemented method of claim 1, wherein the orientation information indicates at least one of:
 (i) a direction of a depth axis of the visible-light image from the given view point,
 (ii) a view direction from the given view point to a corresponding convex-polyhedral region,
 (iii) a direction perpendicular to a real surface that is present in the corresponding convex-polyhedral region and represented in said portion,
 (iv) one of a plurality of predefined directions that matches (i),
 (v) one of the plurality of predefined directions that matches (ii),
 (vi) one of the plurality of predefined directions that matches (iii).

3. The computer-implemented method of claim 1, further comprising, for a visible-light image captured from a given view point, transforming each portion of the visible-light image into a corresponding orthographic projection with respect to a direction of a depth axis of the visible-light image from the given view point, prior to storing said portion in the corresponding node.

4. The computer-implemented method of claim 1, wherein the convex-polyhedral regions are of varying sizes.

5. The computer-implemented method of claim 1, wherein the step of dividing the 3D space comprises:
 initially dividing the 3D space into the convex-polyhedral regions of varying sizes, wherein a size of a given convex-polyhedral region is a function of a distance of the given convex-polyhedral region from at least one initial view point from which initial visible-light images are captured;
 identifying, based on new visible-light images captured from at least one new view point, at least one convex-polyhedral region that includes at least one object having a self-occluding geometry; and
 iteratively dividing the at least one convex-polyhedral region into smaller convex-polyhedral regions.

6. The computer-implemented method of claim 1, further comprising:
 for each new visible-light image that is captured from a given view point, performing the step of determining 3D positions of pixels of the new visible-light image, the step of dividing the new visible-light image into a plurality of new portions and the step of storing in a given node a corresponding new portion of the new visible-light image whose pixels' 3D positions fall inside a corresponding convex-polyhedral region;
 determining whether or not a 3D position of a given pixel of the new visible-light image lies in a proximity of a boundary between adjacent convex-polyhedral regions, wherein the 3D position of the given pixel has been determined to fall inside one of the adjacent convex-polyhedral regions; and
 when the 3D position of the given pixel lies in the proximity of the boundary,
  checking whether or not the given pixel is included in at least one previous portion of at least one previous visible-light image stored previously in a node corresponding to another of the adjacent convex-polyhedral regions; and
  correcting a previous division of the at least one previous visible-light image to store a part of the at least one previous portion that includes the given pixel in a node corresponding to the one of the adjacent convex-polyhedral regions, instead of the node corresponding to the another of the adjacent convex-polyhedral regions.

7. The computer-implemented method of claim 1, further comprising:
 for each new visible-light image that is captured from a given view point, performing the step of determining 3D positions of pixels of the new visible light image and the step of dividing the new visible-light image into a plurality of new portions; and
 for a given node of the 3D data structure,
  selecting at least one of the portions of the visible-light images stored previously in the given node that matches a corresponding new portion of the new visible-light image;
  determining whether to store the corresponding new portion of the new visible-light image in the given node, or to reuse the at least one of the portions of the visible-light images stored previously, based on at least one of:
   a number of occluded pixels in the corresponding new portion and a number of occluded pixels in the at least one of the portions of the visible-light images,
   an age of the at least one of the portions of the visible-light images,
   a resolution of the corresponding new portion and a resolution of the at least one of the portions of the visible-light images,
   an angle formed between at least one direction indicated by orientation information pertaining to the corresponding new portion and at least one direction indicated by orientation information pertaining to the at least one of the portions of the visible-light images,
   a number of pixels that would be occluded if one of the corresponding new portion and the at least one of the portions of the visible-light images is projected onto another of the corresponding new portion and the at least one of the portions of the visible-light images; and
  storing the corresponding new portion of the new visible-light in the given node or reusing the at least one of the portions of the visible-light images stored previously, based on said determining.

8. The computer-implemented method of claim 1, further comprising:
 for each new visible-light image that is captured from a given view point, performing the step of determining 3D positions of pixels of the new visible-light image, the step of dividing the new visible-light image into a plurality of new portions and the step of storing in a given node a corresponding new portion of the new visible-light image whose pixels' 3D positions fall inside a corresponding convex-polyhedral region; and
 projecting pixels of the corresponding new portion of the new visible-light image onto pixels of at least one of the portions of the visible-light images stored previously in the given node whose orientation information matches with orientation information of the corresponding new portion, thereby updating the at least one of the portions of the visible-light images in the given node.

9. The computer-implemented method of claim 1, further comprising:

for each new visible-light image that is captured from a given view point, performing the step of determining 3D positions of pixels of the new visible-light image, the step of dividing the new visible-light image into a plurality of new portions and the step of storing in a given node a corresponding new portion of the new visible-light image whose pixels' 3D positions fall inside a corresponding convex-polyhedral region;

determining a plurality of in-between nodes whose corresponding convex-polyhedral regions lie between the corresponding convex-polyhedral region of the given node and the given view point from which the new visible-light image is captured; and for a given in-between node, finding portions of the visible-light images stored previously in the given in-between node whose orientation information matches with orientation information of the corresponding new portion stored in the given node; and cleaning up said portions of the visible-light images stored previously in the given in-between node to prune out pixels that have been previously determined to lie in a corresponding convex-polyhedral region of the given in-between node and to be occluding the corresponding convex-polyhedral region of the given node.

10. The computer-implemented method of claim 1, further comprising downscaling a given portion of a visible-light image, prior to storing in a corresponding node, when a frequency with which colour changes in the given portion of the visible-light image is less than a predefined threshold frequency.

11. A system comprising:

at least one visible-light camera; and at least one server configured to:

receive visible-light images of a given real-world environment captured by the at least one visible-light camera from a plurality of view points in the given real-world environment, wherein 3D positions of the plurality of view points are represented in a given coordinate system;

divide a 3D space occupied by the given real-world environment into a 3D grid of convex-polyhedral regions, wherein the 3D grid is represented in the given coordinate system;

create a 3D data structure comprising a plurality of nodes, each node representing a corresponding convex-polyhedral region of the 3D space occupied by the given real-world environment;

determine 3D positions of pixels of the visible-light images in the given coordinate system, based on the 3D positions of corresponding view points from which the visible-light images are captured;

divide each visible-light image into a plurality of portions, wherein 3D positions of pixels of a given portion of said visible-light image fall inside a corresponding convex-polyhedral region of the 3D space; and store, in each node of the 3D data structure, corresponding portions of the visible-light images whose pixels' 3D positions fall inside a corresponding convex-polyhedral region of the 3D space;

wherein for a visible-light image captured from a given view point, each portion of the visible-light image is stored in a corresponding node along with orientation information pertaining to said portion;

wherein the at least one server is further configured to:

receive, from a client device, a given view point from a perspective of which a given visible-light image is to be reconstructed using the 3D data structure;

determine a set of visible nodes whose corresponding convex-polyhedral regions are visible from the given view point;

for a given visible node of said set, select, from amongst portions of the visible-light images stored in the given visible node, a portion of a visible-light image whose orientation information indicates at least one direction which matches a direction of a given depth axis of the given visible-light image from the given view point or a view direction from the given view point to a convex-polyhedral region corresponding to the given visible node;

reconstruct the given visible-light image from individual portions of the visible-light images that are selected for each visible node of said set; and send the given visible-light image to the client device, wherein when reconstructing, the at least one server is configured to warp the individual portions of the visible-light images that are selected for each visible node of said set to generate the given visible-light image.

12. The system of claim 11, wherein the orientation information indicates at least one of:

(i) a direction of a depth axis of the visible-light image from the given view point, (ii) a view direction from the given view point to a corresponding convex-polyhedral region, (iii) a direction perpendicular to a real surface that is present in the corresponding convex-polyhedral region and represented in said portion, (iv) one of a plurality of predefined directions that matches (i), (v) one of the plurality of predefined directions that matches (ii), (vi) one of the plurality of predefined directions that matches (iii).

13. The system of claim 11, wherein the at least one server is configured to, for a visible-light image captured from a given view point, transform each portion of the visible-light image into a corresponding orthographic projection with respect to a direction of a depth axis of the visible-light image from the given view point, prior to storing said portion in the corresponding node.

14. The system of claim 11, wherein the convex-polyhedral regions are of varying sizes.

15. The system of claim 11, wherein when dividing the 3D space, the at least one server is configured to:

initially divide the 3D space into the convex-polyhedral regions of varying sizes, wherein a size of a given convex-polyhedral region is a function of a distance of the given convex-polyhedral region from at least one initial view point from which initial visible-light images are captured;

identify, based on new visible-light images captured from at least one new view point, at least one convex-polyhedral region that includes at least one object having a self-occluding geometry; and iteratively divide the at least one convex-polyhedral region into smaller convex-polyhedral regions.

16. The system of claim 11, wherein the at least one server is configured to:
- for each new visible-light image that is captured from a given view point, determine 3D positions of pixels of the new visible-light image, divide the new visible-light image into a plurality of new portions and store in a given node a corresponding new portion of the new visible-light image whose pixels' 3D positions fall inside a corresponding convex-polyhedral region;
- determine whether or not a 3D position of a given pixel of the new visible-light image lies in a proximity of a boundary between adjacent convex-polyhedral regions, wherein the 3D position of the given pixel has been determined to fall inside one of the adjacent convex-polyhedral regions; and
- when the 3D position of the given pixel lies in the proximity of the boundary,
  - check whether or not the given pixel is included in at least one previous portion of at least one previous visible-light image stored previously in a node corresponding to another of the adjacent convex-polyhedral regions; and
  - correct a previous division of the at least one previous visible-light image to store a part of the at least one previous portion that includes the given pixel in a node corresponding to the one of the adjacent convex-polyhedral regions, instead of the node corresponding to the another of the adjacent convex-polyhedral regions.

17. The system of claim 11, wherein the at least one server is configured to:
- for each new visible-light image that is captured from a given view point, determine 3D positions of pixels of the new visible light image and divide the new visible-light image into a plurality of new portions; and
- for a given node of the 3D data structure,
  - select at least one of the portions of the visible-light images stored previously in the given node that matches a corresponding new portion of the new visible-light image;
  - determine whether to store the corresponding new portion of the new visible-light image in the given node, or to reuse the at least one of the portions of the visible-light images stored previously, based on at least one of:
    - a number of occluded pixels in the corresponding new portion and a number of occluded pixels in the at least one of the portions of the visible-light images,
    - an age of the at least one of the portions of the visible-light images,
    - a resolution of the corresponding new portion and a resolution of the at least one of the portions of the visible-light images,
    - an angle formed between at least one direction indicated by orientation information pertaining to the corresponding new portion and at least one direction indicated by orientation information pertaining to the at least one of the portions of the visible-light images,
    - a number of pixels that would be occluded if one of the corresponding new portion and the at least one of the portions of the visible-light images is projected onto another of the corresponding new portion and the at least one of the portions of the visible-light images; and
  - store the corresponding new portion of the new visible-light in the given node or reuse the at least one of the portions of the visible-light images stored previously, based on said determining.

18. The system of claim 11, wherein the at least one server is configured to:
- for each new visible-light image that is captured from a given view point, determine 3D positions of pixels of the new visible-light image, divide the new visible-light image into a plurality of new portions and store in a given node a corresponding new portion of the new visible-light image whose pixels' 3D positions fall inside a corresponding convex-polyhedral region; and
- project pixels of the corresponding new portion of the new visible-light image onto pixels of at least one of the portions of the visible-light images stored previously in the given node whose orientation information matches with orientation information of the corresponding new portion, thereby updating the at least one of the portions of the visible-light images in the given node.

19. The system of claim 11, wherein the at least one server is configured to:
- for each new visible-light image that is captured from a given view point, determine 3D positions of pixels of the new visible-light image, divide the new visible-light image into a plurality of new portions and store in a given node a corresponding new portion of the new visible-light image whose pixels' 3D positions fall inside a corresponding convex-polyhedral region;
- determine a plurality of in-between nodes whose corresponding convex-polyhedral regions lie between the corresponding convex-polyhedral region of the given node and the given view point from which the new visible-light image is captured; and
- for a given in-between node,
  - find portions of the visible-light images stored previously in the given in-between node whose orientation information matches with orientation information of the corresponding new portion stored in the given node; and
  - clean up said portions of the visible-light images stored previously in the given in-between node to prune out pixels that have been previously determined to lie in a corresponding convex-polyhedral region of the given in-between node and to be occluding the corresponding convex-polyhedral region of the given node.

20. The system of claim 11, wherein the at least one server is configured to downscale a given portion of a visible-light image, prior to storing in a corresponding node, when a frequency with which colour changes in the given portion of the visible-light image is less than a predefined threshold frequency.

21. A computer program product comprising a non-transitory machine-readable data storage medium having stored thereon program instructions that, when executed by a processor, cause the processor to:
- receive visible-light images of a given real-world environment captured by at least one visible-light camera from a plurality of view points in the given real-world environment, wherein 3D positions of the plurality of view points are represented in a given coordinate system;
- divide a 3D space occupied by the given real-world environment into a 3D grid of convex-polyhedral regions, wherein the 3D grid is represented in the given coordinate system;

create a 3D data structure comprising a plurality of nodes, each node representing a corresponding convex-polyhedral region of the 3D space occupied by the given real-world environment;

determine 3D positions of pixels of the visible-light images in the given coordinate system, based on the 3D positions of corresponding view points from which the visible-light images are captured;

divide each visible-light image into a plurality of portions, wherein 3D positions of pixels of a given portion of said visible-light image fall inside a corresponding convex-polyhedral region of the 3D space; and store, in each node of the 3D data structure, corresponding portions of the visible-light images whose pixels' 3D positions fall inside a corresponding convex-polyhedral region of the 3D space;

wherein for a visible-light image captured from a given view point, store each portion of the visible-light image in a corresponding node along with orientation information pertaining to said portion, wherein for a given view point from a perspective of which a given visible-light image is to be reconstructed using the 3D data structure, determine a set of visible nodes whose corresponding convex-polyhedral regions are visible from the given view point;

wherein for a given visible node of said set, select from amongst portions of the visible-light images stored in the given visible node, a portion of a visible-light image whose orientation information indicates at least one direction which matches a direction of a given depth axis of the given visible-light image from the given view point or a view direction from the given view point to a convex-polyhedral region corresponding to the given visible node; and reconstruct the given visible-light image from individual portions of the visible-light images that are selected for each visible node of said set, wherein the step of reconstructing comprises warping the individual portions of the visible-light images that are selected for each visible node of said set to generate the given visible-light image.

22. The computer program product of claim 21, wherein the orientation information indicates at least one of:
(i) a direction of a depth axis of the visible-light image from the given view point,
(ii) a view direction from the given view point to a corresponding convex-polyhedral region,
(iii) a direction perpendicular to a real surface that is present in the corresponding convex-polyhedral region and represented in said portion,
(iv) one of a plurality of predefined directions that matches (i),
(v) one of the plurality of predefined directions that matches (ii),
(vi) one of the plurality of predefined directions that matches (iii).

23. The computer program product of claim 21, wherein the program instructions, when executed, cause the processor to:

receive, from a client device, a given view point from a perspective of which a given visible-light image is to be reconstructed using the 3D data structure;

determine a set of visible nodes whose corresponding convex-polyhedral regions are visible from the given view point;

for a given visible node of said set, select, from amongst portions of the visible-light images stored in the given visible node, a portion of a visible-light image whose orientation information indicates at least one direction which matches a direction of a given depth axis of the given visible-light image from the given view point or a view direction from the given view point to a convex-polyhedral region corresponding to the given visible node;

reconstruct the given visible-light image from individual portions of the visible-light images that are selected for each visible node of said set; and send the given visible-light image to the client device.

* * * * *